US007698931B2

(12) United States Patent
Hanari et al.

(10) Patent No.: US 7,698,931 B2
(45) Date of Patent: Apr. 20, 2010

(54) FUEL PRESSURE SENSOR DIAGNOSING DEVICE AND METHOD

(75) Inventors: Akira Hanari, Fujisawa (JP); Kouichirou Yomogida, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 190 days.

(21) Appl. No.: 12/039,079

(22) Filed: Feb. 28, 2008

(65) Prior Publication Data

US 2008/0209990 A1 Sep. 4, 2008

(30) Foreign Application Priority Data

Mar. 1, 2007 (JP) ............................ 2007-051788

(51) Int. Cl.
*G01M 15/05* (2006.01)

(52) U.S. Cl. .................................................. 73/114.43

(58) Field of Classification Search .............. 73/114.38, 73/114.41, 114.42, 114.43, 114.45, 114.48, 73/114.51

See application file for complete search history.

(56) References Cited

U.S. PATENT DOCUMENTS 7,013,720 B2 * 3/2006 Date ...................... 73/114.51
2003/0213294 A1 * 11/2003 Date ........................ 73/118.1
2007/0084274 A1 * 4/2007 Takayanagi ............... 73/118.1

FOREIGN PATENT DOCUMENTS

JP 2001-173507 A 6/2001
JP 2003-222045 8/2003

* cited by examiner

*Primary Examiner*—Eric S McCall
(74) *Attorney, Agent, or Firm*—McCormick, Paulding & Huber LLP

(57) ABSTRACT

A fuel pressure sensor diagnosing device for diagnosing a fuel pressure sensor for detecting pressure in a common rail in which a high-pressure fuel to be supplied to an engine is accumulated, the device comprising: fuel temperature detection for detecting fuel temperature; and failure determination, provided with the fuel temperature detection for detecting fuel temperature via subsequent to stopping of the engine, for obtaining a resting and stabilization time between when the pressure in the common rail drops and when the pressure stabilizes on the basis of this detected fuel temperature, detecting a stabilized fuel pressure via the fuel pressure sensor subsequent to lapse of the resting and stabilization time, and determining a failure of the fuel pressure sensor when the detected stabilized fuel pressure exceeds a predetermined upper limit threshold value or is less than a predetermined lower limit threshold value.

9 Claims, 4 Drawing Sheets

FUEL PRESSURE SENSOR DIAGNOSING DEVICE AND METHOD

CROSS REFERENCE TO RELATED APPLICATION

This application claims priority to Japanese Patent Application No. 2007-51788 (filed Mar. 1, 2007), the details of which are incorporated herein by reference.

BACKGROUND OF THE INVENTION

1. Field of the Invention

The present invention relates to a device and method for diagnosing a fuel pressure sensor for detecting common rail fuel pressure.

2. Description of the Related Art

A control computer of pressure-accumulating type fuel injection control devices comprising a so-called common rail uses a regulating valve to execute a feedback control on the discharge quantity of an injection pump (supply pump) based on fuel pressure sensor (common rail pressure sensor) information obtained while the engine is running in such a way as to ensure a target common rail pressure value established in accordance with the engine revolutions and load and so on is produced. To that end, a common rail pressure sensor serves a very important function.

If a characteristic shift (drift) in the output voltage of this common rail pressure sensor occurs, the feedback control executed on the common rail pressure while the engine is running will be based on an erroneously perceived value and, in turn, the actual pressure will be higher or lower than the virtual pressure (pressure detected by the common rail pressure sensor).

As a result, when characteristic shift of a common rail pressure sensor occurs, irrespective of the injector and so on being instructed by the control computer to generate an identical target injection quantity, the actual injection quantity changes due to the abnormal common rail pressure and, as the desired fuel injection quantity cannot be produced, leads to exhaust emission and performance deterioration.

A method based on detecting short-circuiting or disconnection of a sensor circuit is conventionally used as a method for monitoring and diagnosing the normality/abnormality of a common rail pressure sensor.

In another method for indirectly diagnosing a common rail pressure sensor, because the common rail pressure limit value in terms of feedback control is reached and, in the end, compliance therewith is impossible when a marked characteristic shift (drift) in the output value of a common rail pressure sensor occurs while an engine is running, the diagnosis utilizes a virtual increase or reduction in the real common rail pressure as detected by the common rail pressure sensor with respect to a target common rail pressure value.

In addition, Japanese Unexamined Patent Application No. 2001-173507 proposes a means for detecting the occurrence of offset of a fixed level or greater of a common rail pressure sensor characteristic value. In Japanese Unexamined Patent Application No. 2001-173507, common rail pressure sensor characteristic detection is performed when the common rail pressure drops to atmospheric pressure such as when the vehicle is stationary. More specifically, in Japanese Unexamined Patent Application No. 2001-173507, engine stoppage for a fixed time is evaluated on the basis of a drop in water temperature, and the common rail pressure sensor is diagnosed as abnormal when, in a state in which sufficiently rest and stabilization of the common rail pressure has occurred, the ignition key is ON, and the engine rotation is stopped prior to it being started, the common rail pressure, which should be essentially equivalent to the atmospheric pressure, is high.

However, the following problems are inherent to the diagnosing method described above.

First, in the conventional method for indirectly diagnosing a common rail pressure sensor, because the diagnosis is performed while the supply pump is being actuated, aside from simple disconnection/short-circuiting failure, both failure of the common rail pressure sensor and failure of the supply pump must be considered as causes of a lack of equivalence between a target common rail pressure and common rail sensor detected pressure and, as a result, it is difficult to specify which component part is the cause thereof and vehicle inspection takes a significant amount of time.

Furthermore, in Japanese Unexamined Patent Application No. 2001-173507, because the diagnosis is performed when the ignition key is ON subsequent to a sufficient stabilization having elapsed, the engine rotation must be stopped for at least the time required for the diagnosis even though the ignition key is ON. For this reason, there is a concern that diagnosis will be precluded from being performed when a driver switches ON the ignition key and immediately thereafter actuates the start causing the engine to rotate.

Furthermore, in Japanese Unexamined Patent Application No. 2001-173507, because the engine cannot be started when a shift in the common rail pressure sensor characteristic occurs and the shifted characteristic is voltage offset to the high side and fixed, this presents an opportunity for a diagnosis to be performed. On the other hand, when the shifted characteristics are offset to the low side, there is a possibility that the engine will be started and run in an abnormal state and, in turn, a concern that a diagnosis will not be able to be performed.

SUMMARY OF THE INVENTION

It is an object of the present invention to provide a fuel pressure sensor diagnosing device and method that, in resolving the aforementioned problems, facilitates the reliable detection of fuel pressure sensor failure.

One mode of the present invention designed to attain the aforementioned object constitutes a fuel pressure sensor diagnosing device for diagnosing a fuel pressure sensor for detecting pressure in a common rail in which a high-pressure fuel to be supplied to an engine is accumulated, comprising: fuel temperature detection means for detecting a fuel temperature; and failure determination means, provided with the fuel temperature detection means for detecting a fuel temperature subsequent to stopping of the engine, for determining a resting and stabilization time between when a pressure in the common rail drops and when the pressure stabilizes on the basis of this fuel temperature, detecting a stabilized fuel pressure via the fuel pressure sensor subsequent to lapse of the resting and stabilization time, and determining a failure of the fuel pressure sensor when the detected stabilized fuel pressure exceeds a predetermined upper limit threshold value or is less than a predetermined lower limit threshold value.

The aforementioned resting and stabilization time is preferably set so as to increase as the fuel temperature becomes lower.

Each of the predetermined upper limit value threshold value and predetermined lower limit threshold value are preferably set, on the basis of the fuel temperature detected by aforementioned fuel temperature detection means subsequent to the lapse of the aforementioned resting and stabilization time, so as to be greater as the fuel temperature becomes lower.

Aforementioned failure determination means is preferably connected to an ignition key for starting or stopping the aforementioned engine and to revolution number detection means for detecting the number of revolutions of the aforementioned engine, failure determination means determining the aforementioned engine as having stopped when the aforementioned ignition key is OFF and the number of revolutions of the aforementioned engine detected by aforementioned revolution number detection means is substantially zero.

Another mode of the present invention designed to attain the aforementioned object constitutes a fuel pressure sensor diagnosing method for diagnosing a fuel pressure sensor for detecting pressure in a common rail in which a high-pressure fuel to be supplied to an engine is accumulated, the method comprising: detecting a fuel temperature subsequent to stopping of the engine and determining a resting and stabilization time between when a pressure in the common rail drops and when the pressure stabilizes on the basis of this fuel temperature, detecting a stabilized fuel pressure via the fuel pressure sensor subsequent to lapse of the resting and stabilization time, and determining a failure of the fuel pressure sensor when the stabilized fuel pressure exceeds a predetermined upper limit threshold value or is less than a predetermined lower limit threshold value.

DESCRIPTION OF THE PREFERRED EMBODIMENTS

The "fuel pressure sensor diagnosing device and method" described by the specification, claims and drawings of this application is described in Japanese Patent Application No. 2007-51788.

A preferred embodiment of the present invention will be hereinafter described with reference to the attached drawings.

The fuel pressure sensor diagnosing device (hereinafter the diagnosing device) of this embodiment has application in a diesel engine in which a high-pressure fuel is held in a common rail for injection through an injector, for example, in a diesel engine mounted in an automotive vehicle.

Figure 1:
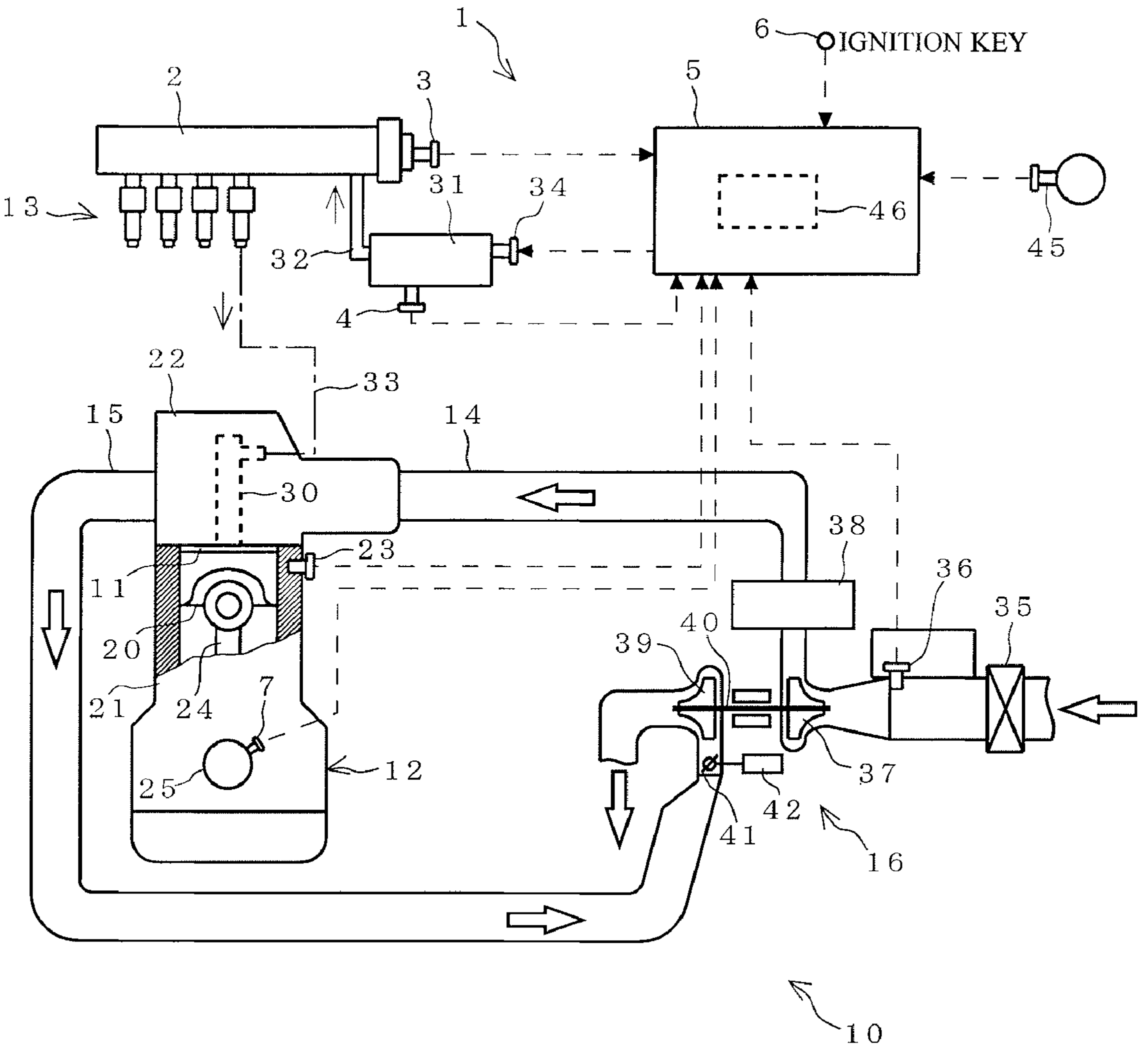
FIG. 1 is a schematic diagram of an engine in which one embodiment of a fuel pressure sensor diagnosing device pertaining to the present invention has application.

The general structure of an engine in which the diagnosing device of the embodiment has application will be described with reference to FIG. 1.

An engine 10 comprises an engine main body 12 in which a combustion chamber 11 is formed, an pressure-intensifying type fuel injection control device 13 for injecting and supplying fuel to the engine main body 12 to the combustion chamber 11, an intake pipe 14 for supplying intake air to the engine main body 12, an exhaust pipe 15 for discharging exhaust gas from the engine main body 12, a supercharger 16 for pressurizing the intake air of the engine main body 12, and a control computer 5 for controlling the engine main body 12, the pressure-intensifying type fuel injection control device 13, and the supercharger 16 and so on.

The engine main body 12 comprises a cylinder block 21 in which a piston 20 is vertically-slidably housed and a cylinder head 22 mounted on an upper portion of the cylinder block 21, the combustion chamber 11 formed by the piston 20, the cylinder block 21 and the cylinder head 22.

A water jacket (not shown in the drawing) for distributing cooling water for cooling the engine main body 12 is formed in the cylinder block 21 and the cylinder head 22. A water temperature sensor 23 for detecting the cooling water temperature is mounted on this water jacket.

A crankshaft 25 coupled by way of a connecting rod 24 to the piston 20 is housed in a lower portion of the cylinder block 21, and an engine revolution number sensor 7 for detecting the engine revolution number of the engine main body 12 (engine revolution number detection means) is mounted on the crankshaft 25.

The pressure-intensifying type fuel injection control device 13 comprises an injector 30 for injecting fuel into the combustion chamber 11, a common rail 2 for pressure-intensifying the high-pressure fuel supplied to the injector 30, a supply pump (fuel injection pump, high-pressure pump) 31 for pressurizing (raising the pressure) of the fuel and pressure-feeding it to the common rail 2, control means for controlling the discharge quantity (supply quantity) of this supply pump 31, and a fuel temperature sensor 4 serving as fuel temperature detection means. In this embodiment, the aforementioned control computer 5 serves as control means.

The common rail 2 communicates at its supply side with the supply pump 31 by way of a fuel passage 32 and with the common rail pressure sensor 30 by way of a fuel passage 33, and communicates at its return side with a fuel tank by way of a return passage not shown in the diagram.

The common rail 2 comprises a common rail pressure sensor (fuel pressure sensor) 3 for detecting the fuel pressure in the common rail 2 (common rail pressure). The common rail pressure sensor 3 is configured from, for example, a piezoelectric element sensor or semiconductor, the larger the measured pressure the greater the voltage output therefrom.

Figure 4:
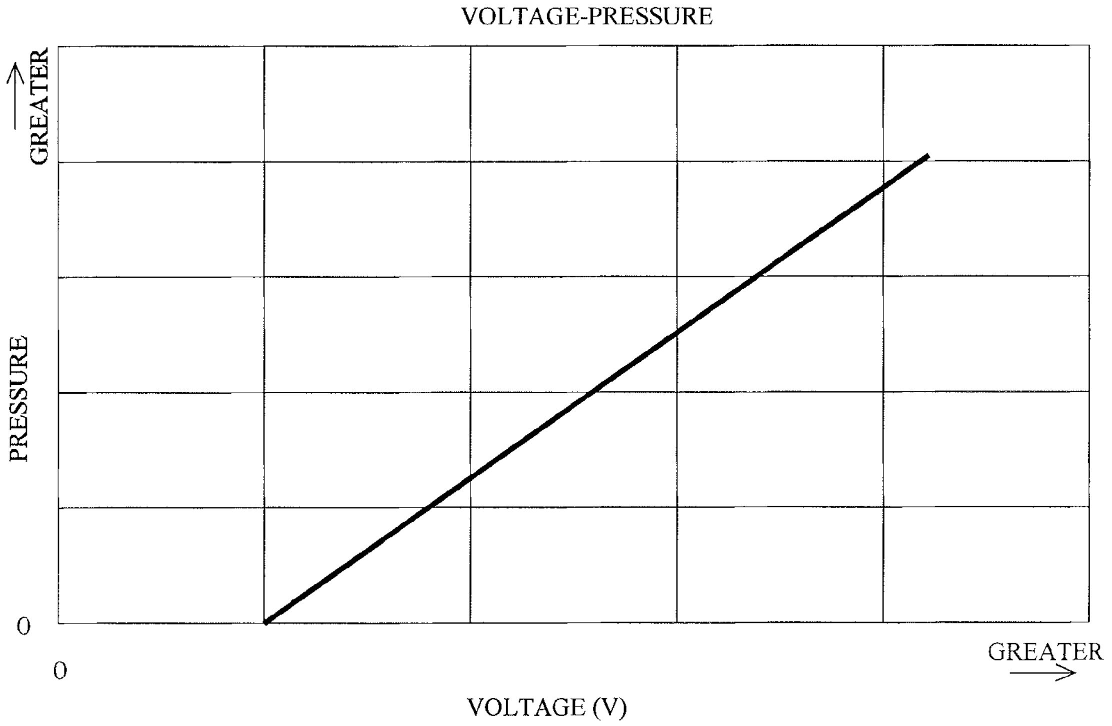
FIG. 4 is a diagram for explaining the voltage characteristics of a fuel pressure sensor based on this embodiment.

FIG. 4 is a diagram showing one example of the voltage characteristics of a common rail pressure sensor 3. As shown in FIG. 4, the voltage of the common rail pressure sensor 3 increases substantially proportionally to the detected pressure.

The common rail pressure sensor 3 is connected to a control computer 5 into which the detected common rail pressure (voltage) is inputted.

The supply pump 31 is driven by the engine main body 12 and, for example, is coupled with the crankshaft 25 by way of a belt-pulley (not shown in the diagram) so as to be synchronously driven with the rotation of the engine main body 12. The supply pump 31 comprises a regulating valve 34 for regulating the discharge quantity, the discharge side of this regulating valve 34 being connected to a return passage (not shown in the diagram), and the fuel of the supply pump 31 being returned to the fuel tank by way of this return passage.

When the engine is running, the fuel is pressure-fed by means of a feed pump from a fuel tank (not shown in the diagram) to the supply pump 31 whereupon, subsequent to the fuel being pressured to a predetermined injection pressure by the supply pump 31, it is accumulated in the common rail 2 as a high-pressure fuel.

When the engine stops, the fuel in the common rail 2 is returned to the fuel tank along a return passage (not shown in the diagram) connected to each of the common rail 2 and the regulating valve 34 of the supply pump 31.

The fuel temperature sensor 4 is mounted on the supply pump 31 to detect the temperature of the fuel in the supply pump 31. The fuel temperature sensor 4 is connected to the control computer 5 into which the detected fuel temperature is inputted. The position for mounting the fuel temperature sensor 4 is not limited to the supply pump 31, and it may be mounted on the common rail 2.

An air cleaner 35, an intake air temperature sensor 36, a later-described compressor 37 of the supercharger 16 and an intercooler 38 are respectively provided in this order from the upstream side of the intake pipe 14, the downstream side thereof being connected to an intake port (not shown in the diagram) of the engine main body 12.

An upstream end of the exhaust pipe 15 is connected to an exhaust port (not shown in the diagram) of the engine main body 12, and a later-described turbine 39 of the supercharger 16 or post-processing device (not shown in the diagram) or the like are provided downstream thereof.

The supercharger 16 comprises a compressor 37 interposed in the intake pipe 14 for pressuring the intake air, a turbine 39 interposed in the exhaust pipe 15 rotationally-driven by the exhaust gas, and a turbo-shaft 40 that couples the turbine 39 and the compressor 37 and transmits the power of the turbine 39 to the compressor 37. In addition, a variable vane 41 for controlling the supercharged pressure and a vane actuator 42 for driving this variable vane 41 are provided in the turbine 39, the vane actuator 42 being connected to and controlled by the control computer 5.

The control computer 5 is connected to a range of sensors including the aforementioned engine revolution number sensor 7, the water temperature sensor 23, the common rail pressure sensor 3, the fuel temperature sensor 4, the intake air temperature sensor 36, a vehicle speed sensor 45 for detecting vehicle speed, and an atmospheric pressure sensor 46 provided in the control computer 5, the detected values of these sensors being input thereto. In addition, the control computer 5 is connected to an ignition key 6 for starting or stopping the engine 10 (engine main body 12), an ON signal and OFF signal therefrom being inputted thereto. When an OFF signal is input from the ignition key 6, the control computer 5 stops the fuel injection of the injector 30, and then basically interrupts its own power supply.

The control computer 5 is connected to the injector 30, the regulating valve 34 of the supply pump 31, and to actuators including the vane actuator 42 of the turbine 39, and outputs a control signal to these actuators.

The control computer 5 controls the injector 30 by determining a target fuel injection quantity and a target fuel injection period in accordance with the operating state of the engine main body 12 (for example, the engine revolution number and engine load and so on).

Furthermore, the control computer 5 determines a target common rail pressure in accordance with the operating state of the aforementioned engine main body 12, and executes a feedback control on the regulating valve 34 of the supply pump 31 in such a way as to ensure the actual common rail pressure detected by the common rail pressure sensor 3 corresponds with the target common rail pressure.

In this embodiment, a diagnosing device 1 for diagnosing failure caused by disconnection, short-circuiting or characteristic shift of the common rail pressure sensor 3 is provided in the engine 10.

This diagnosing device 1 comprises the aforementioned fuel temperature sensor 4 for detecting the fuel temperature, and failure determination means for determining the fuel temperature via the fuel temperature sensor 4 subsequent to the engine 10 having stopped and determining a resting and stabilization time between when the pressure of the common rail drops and when it stabilizes on the basis of this fuel temperature, detecting the stabilized fuel pressure via the common rail pressure sensor 3 subsequent to the resting and stabilization time having elapsed, and evaluating a failure (abnormality) of the common rail pressure sensor 3 when the detected stabilized fuel pressure exceeds an upper limit predetermined threshold value or is less than a predetermined lower limit threshold value. In this embodiment, the control computer 5 serves as the failure determination means.

The control computer 5 comprises a memory in which a map (see FIG. 3) of the later-described resting and stabilization time and so on is stored, and a timer for measuring time (not shown in the diagram). In addition, control computer 5 detects the voltage of a battery (not shown in the diagram) from which power is supplied thereto.

Here, in the diagnosing device 1 of this embodiment, the resting and stabilization time is set so as to be longer the lower the fuel temperature.

In addition, the control computer 5 of the diagnosing device 1 evaluates the engine 10 as having been stopped when the ignition key 6 is OFF and the revolution number of the engine 10 (engine main body 12) detected by the engine revolution number sensor 7 is substantially 0.

The fuel pressure sensor diagnosing method (hereinafter referred to as the diagnosing method) used by the diagnosing device 1 of this embodiment shall be hereinafter described.

The diagnosis performed using the diagnosing method of the common rail pressure sensor 3 of this embodiment is performed when a driver switches OFF the ignition key 6 to stop the engine 10.

A residual fuel pressure usually remains in the common rail 2 for a certain time even after the ignition key 6 has been switched OFF and the engine 10 stopped.

Thereupon, in this embodiment, when predetermined diagnosis executing conditions have been established subsequent to the engine 10 having been stopped as a result of the ignition key 6 having been switched OFF, the control computer 5 (CPU) actuates a delay timer that delays the power supply interruption. As a result of this delay timer being actuated, the control computer 5 continues to perform CPU calculations and awaits a drop in the residual pressure. Thereafter, when the rest/stabilization of the common rail pressure is reached, the control computer 5 judges that a drift in the sensor value characteristic of the common rail pressure sensor 3 (characteristic values) has occurred if the detected fuel pressure of the common rail pressure sensor 3 (sensor voltage pressure) is not within a certain range equivalent to the atmospheric pressure and, in turn, evaluates this as a failure of the common rail pressure sensor 3.

The advantage of the diagnosing method of this embodiment lies in the time required for the execution thereof subsequent to an operation to stop the engine 10 being performed being less than 1 minute which, accordingly, affords a more reliable diagnosis than a diagnosis performed when the ignition key 6 is switched ON to start the engine 10.

Figure 2:
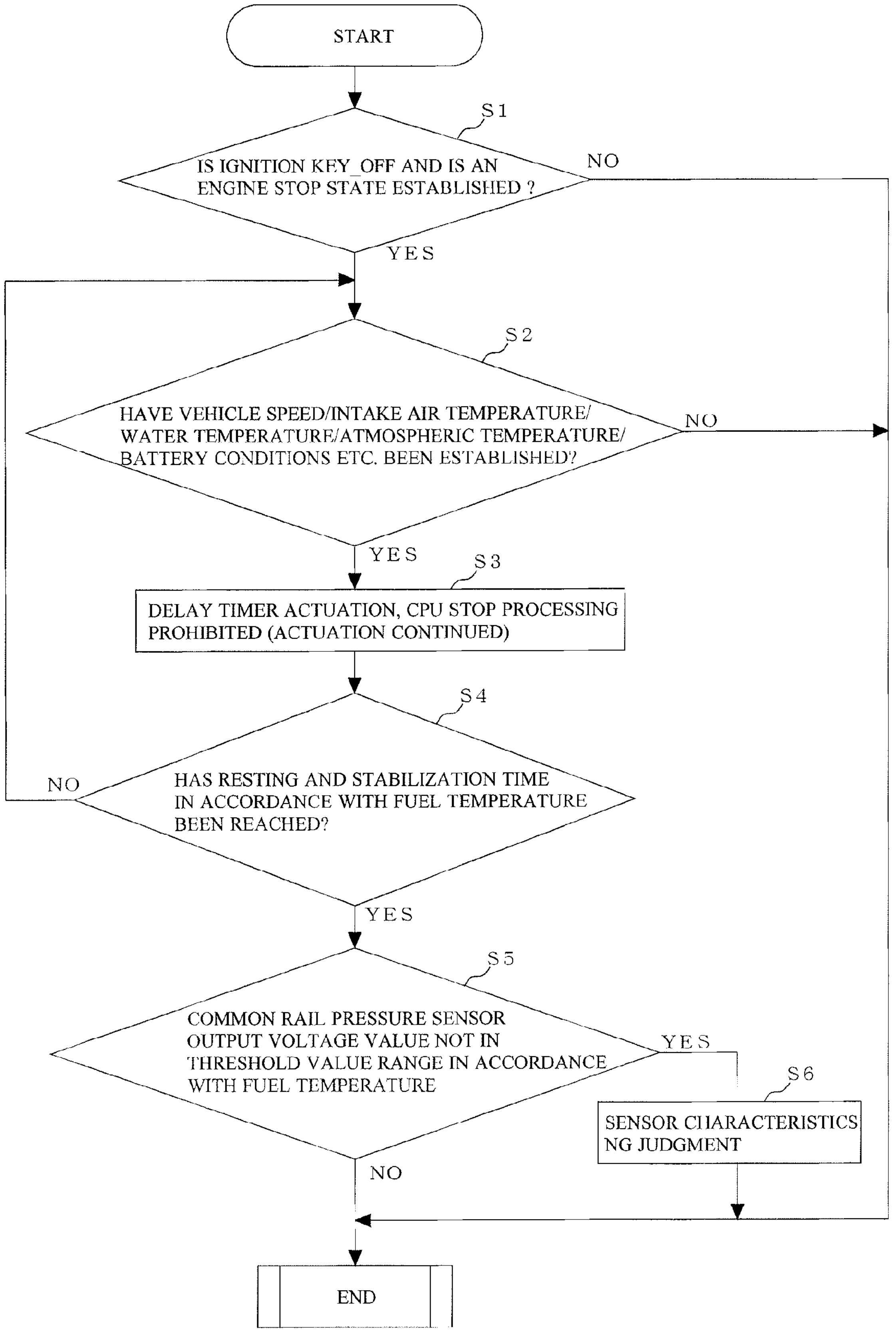
FIG. 2 shows the flow of one example of a fuel pressure sensor diagnosing method of this embodiment.

An example of the diagnosing method of the common rail pressure sensor 3 of this embodiment will be described with reference to the flow shown in FIG. 2. The flow of FIG. 2 is executed by the control computer 5.

In Step S1, the control computer 5 evaluates whether or not the engine 10 has stopped. In this embodiment, the engine 10 is evaluated as having stopped when the rotation of the engine main body 12 has stopped.

More specifically, first, when the ignition key 6 is switched OFF by a driver to stop the engine, the control computer 5 stops issuing a fuel injection command to the injector 30. Next, the control computer 5 evaluates whether or not the signal from the engine revolution number sensor 7 is 0 rpm, and evaluates the engine 10 as having stopped when the signal is 0 rpm. For example, the control computer 5 evaluates the engine 10 as having stopped when a state in which the engine revolution number detected by the engine revolution number sensor 7 is 0 rpm has continued for a period of approximately 1 second. The rotation of the supply pump 31 is also stopped as a result of the engine 10 having stopped and, in turn, the common rail pressure starts to drop.

In Step S2, the control computer 5 evaluates whether or not the environment (fuel temperature, intake air temperature, atmospheric pressure and so on) is a predetermined level or above, whether or not the battery is operating normally, and whether or not when the vehicle is stationary the engine is in the stopped state. This is to prohibit diagnosis from being performed where failure of the common rail pressure sensor 3 cannot be accurately evaluated such as in very cold regions in which the increase in fuel viscosity is excessive and in high regions in which the atmospheric pressure is low, while still allowing the diagnosis to be performed at other times.

More specifically, whether or not the following diagnosis executing conditions (1) to (6) have been established is confirmed. All the diagnosis executing conditions (1) to (6) are used to prevent misdiagnosis.

Fuel temperature detected by the fuel temperature sensor 4 is between −7° C. and 255° C.

Intake air temperature detected by the intake air temperature sensor 36 is between −7° C. and 255° C.

Vehicle speed detected by the vehicle speed sensor 45 is 0 km/h (stationary).

Atmospheric pressure detected by the atmospheric pressure sensor 46 is not less than 75 kPa.

Battery voltage is not less than 10V (normal voltage).

Sensors used for the diagnosis executing conditions are normal (no abnormality such as disconnection or short-circuiting).

If these diagnosis executing conditions (1) to (6) are established, in Step S3, in order to ensure the time for diagnosis of the common rail pressure sensor 3, the control computer 5 actuates the delay timer to delay power supply interruption and the CPU calculations are continued.

A delay time Td to power supply interruption is obtained as the sum of a basic power supply interruption delay time T1 when diagnosis is not being performed, a resting and stabilization time (basic time) T2 obtained using the fuel temperature as a parameter, a judgment processing time T3, and a power supply interruption permissible time T4 (Td=T1+T2+T3+T4).

Here, the resting and stabilization time T2 of which the fuel temperature serves as a parameter is set so as to increase the lower the fuel temperature. This is based on the need for a longer resting and stabilization time due to the increased viscosity of a fuel the lower the temperature thereof and, in turn, the slower residual pressure drop in the common rail 2.

Figure 5:
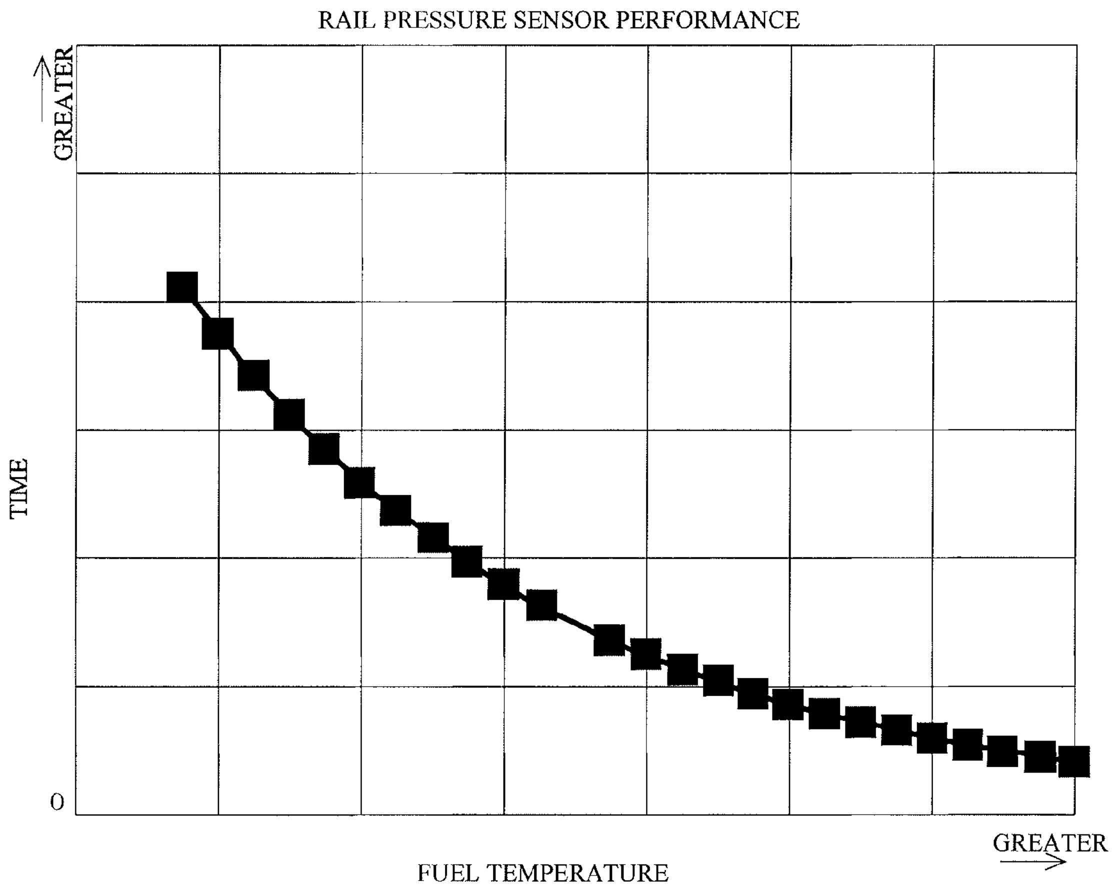
FIG. 5 is a diagram for explaining the relationship between fuel temperature and time until rest and stabilization of the common rail pressure occurs subsequent to engine rotation stoppage.

FIG. 5 is an empirical graph of time data until the common rail pressure is stationary in a 6-cylinder engine. In FIG. 5, the vertical axis denotes the time and the horizontal axis denotes the fuel temperature, the points indicated by the squares representing a plot of the time required for stabilization at each temperature.

As shown in FIG. 5, the time taken for the common rail pressure to stabilize increases as the fuel temperature drops.

Figure 3:
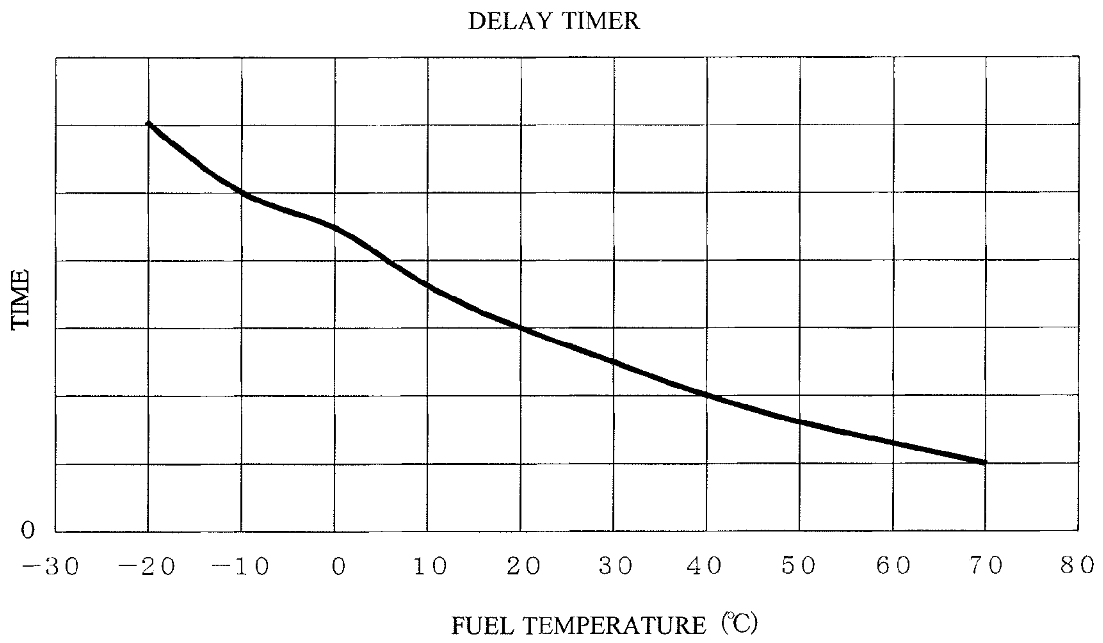
FIG. 3 is a diagram for explaining the relationship between fuel temperature and the resting and stabilization time of this embodiment.

The control computer 5 can determine the resting and stabilization time T2 based on the graph of FIG. 5, for example, based on the detected fuel temperature of the fuel temperature sensor 4 and a map of delay timer set times (resting and stabilization times) T2 as shown in FIG. 3 pre-stored in a memory (not shown in the diagram) in the control computer 5. In addition, a relational expression between the fuel temperature and the resting and stabilization time T2 may be determined from the graph of FIG. 5 and stored in the memory (not shown in the diagram) of the control computer 5, the calculation of the resting and stabilization time T2 by the control computer 5 in accordance with this relational expression and the detected fuel temperature of the fuel temperature sensor 4 being also able to be considered.

In this way, in Step S3, the control computer 5 determines the resting and stabilization time T2 from the fuel temperature detected by the fuel temperature sensor 4, and sets the delay time Td described above on the basis of this resting and stabilization time T2.

In Step S4, the control computer 5 evaluates whether or not the resting and stabilization time T2 has elapsed.

If the resting and stabilization time T2 is evaluated as having elapsed in Step S4, in Step S5, the control computer 5 compares the detected common rail pressure of the common rail pressure sensor 3 with a predetermined upper threshold value and lower threshold value to judge whether or not the common rail pressure sensor 3 is normal.

More specifically, the control computer 5 detects a sensor voltage value of the common rail pressure sensor 3 and, when the detected sensor voltage value exceeds a voltage equivalent to an upper threshold value (hereinafter the upper limit voltage) or is less than a voltage equivalent to a lower threshold value (hereinafter the lower limit voltage), evaluates this as a drift (offset) failure of the common rail pressure sensor 3.

In this embodiment, in the fuel temperature range between −20° C. and 70° C., the upper limit threshold value and the lower limit threshold value are uniformly set to the same value respectively for all fuel temperatures. For example, a gauge pressure upper limit threshold value of +15.6 MPa (upper limit voltage of 1.25V) and gauge pressure lower limit value of −15.6 MPa (lower limit voltage of 0.75V) respectively are set. That is to say, because the common rail pressure can be considered as stabilizing to approximately atmospheric pressure subsequent to the supply pump 31 having been stopped, the setting is performed so that maximum permissible error added to the atmospheric pressure constitutes the upper threshold value and the maximum permissible error deducted therefrom constitutes the lower threshold value.

If the detected common rail pressure of the common rail pressure sensor 3 exceeds the upper limit threshold value or is less than the lower limit threshold value in Step S5, in Step S6, the control computer 5, subsequent to a predetermined failure processing having been performed, ends the flow of FIG. 2 and interrupts the power supply.

Failure processing examples for consideration include storage of common rail pressure sensor 3 failure information in a memory or the like not shown in the diagram and notifying a drive of failure information the next time the ignition key 6 is switched ON, or outputting the failure information to a diagnostic tool or like during vehicle inspection.

On the other hand, if the detected common rail pressure is not greater than the upper limit threshold value or is not less than the lower limit threshold value in Step S5, the control computer 5 evaluates the common rail pressure sensor 3 as normal and ends the flow of FIG. 2.

When the ignition key 6 is switched ON or the rotation of the engine main body 12 is initiated (engine is restarted) in Step S1, or one of either of the diagnosing executing conditions (1) to (6) has not been established in Step S2, the control computer 5 cancels the delay timer control (Step S2 to S4) for delaying the power supply interruption, stops the processing, and ends the flow.

The cancellation of the delay timer control is implemented to prevent misdiagnosis caused by interference (such as noise) generated after the diagnosing executing conditions (1) to (6) have been satisfied and the delay operation has started.

Furthermore, as a result of the flow of FIG. 2 being ended subsequent to this cancellation, the start and cancellation of the delay operation are repeated by means of noise intermittently imparted to the detected signal of the atmospheric pressure sensor 46 or the like, the effect of which is to prevent a marked delay in the power supply interruption. The end of the flow subsequent to this cancellation is performed with consideration to battery consumption so that unnecessary battery consumption can be suppressed.

In this embodiment, in the diagnosis of the common rail pressure sensor 3 when an operation to stop the engine 10 is being performed, a failure (characteristic shift) of the common rail pressure sensor 3 can be reliably evaluated by provision of the resting and stabilization time T2 for waiting for the rest and stabilization of the common rail pressure as it drops to approximately atmospheric pressure subsequent to the supply pump 31 having been stopped.

Furthermore, a reliable diagnosis can be performed and a shorter diagnosis time facilitated as a result of the resting and stabilization time T2 being set in accordance with the fuel temperature when the supply pump 31 is stopped.

In other words, if the resting and stabilization time is taken to be a fixed value irrespective of the fuel temperature, there is a concern that setting this fixed value longer will result in the time wasted waiting for the stabilization of the fuel pressure and, in turn, the diagnosis time being longer, and the battery being wastefully consumed. On the other hand, there is a concern that setting the aforementioned fixed value shorter to overcome this will result in the diagnosis being performed when the fuel temperature is a low temperature prior to the fuel pressure having stabilized.

In contrast thereto, by setting the resting and stabilization time T2 in accordance with the fuel temperature so as to be greater the lower the fuel temperature as is the case in the invention of this application, the diagnosis of the common rail pressure sensor 3 can be reliably implemented in a shorter time.

In addition thereto, because the diagnosis performed in this embodiment is performed when the supply pump 31 is stopped, if the detected common rail pressure of the common rail pressure sensor 3 is abnormal, the failed component part as the cause thereof can be easily specified and a post facto inspection promptly carried out.

The present invention is not limited to the embodiment described above, and a variety of modified examples and application examples thereof may be considered.

For example, the predetermined upper threshold value and predetermined lower limit threshold value may be set on the basis of a fuel temperature detected by the fuel temperature sensor 4 subsequent to the resting and stabilization time T2 having elapsed. For example, each of the predetermined upper limit threshold value and the predetermined lower limit threshold value may be set in such a way as to be greater the lower the fuel temperature. This is based on the notion that when the viscosity of the fuel is high at a low temperature, the common rail pressure will stabilize at a higher pressure than atmospheric pressure due to poor fuel flow.

What is claimed is:

1. A fuel pressure sensor diagnosing device for diagnosing a fuel pressure sensor for detecting pressure in a common rail in which a high-pressure fuel to be supplied to an engine is accumulated, comprising:

fuel temperature detection means for detecting a fuel temperature; and failure determination means, provided with the fuel temperature detection means for detecting a fuel temperature subsequent to stopping of the engine, for determining a resting and stabilization time between when a pressure in the common rail drops and when the pressure stabilizes on the basis of this fuel temperature, detecting a stabilized fuel pressure via the fuel pressure sensor subsequent to lapse of the resting and stabilization time, and determining a failure of the fuel pressure sensor when the detected stabilized fuel pressure exceeds a predetermined upper limit threshold value or is less than a predetermined lower limit threshold value.

2. The fuel pressure sensor diagnosing device as claimed in claim 1, wherein the failure determination means is connected to an ignition key for starting or stopping the engine and to revolution number detection means for detecting the number of revolutions of the engine, failure determination means determining the engine as having stopped when the ignition key is OFF and the number of revolutions of the engine detected by the revolution number detection means is substantially zero.

3. The fuel pressure sensor diagnosing device as claimed in claim 1, wherein each of the predetermined upper limit value threshold value and predetermined lower limit threshold value are set, on the basis of a fuel temperature detected by the fuel temperature detection means subsequent to the lapse of the resting and stabilization time, so as to be greater as the fuel temperature becomes lower.

4. The fuel pressure sensor diagnosing device as claimed in claim 3, wherein the failure determination means is connected to an ignition key for starting or stopping the engine and to revolution number detection means for detecting the number of revolutions of the engine, failure determination means determining the engine as having stopped when the ignition key is OFF and the number of revolutions of the engine detected by the revolution number detection means is substantially zero.

5. The fuel pressure sensor diagnosing device as claimed in claim 1, wherein the resting and stabilization time is set so as to be longer as a fuel temperature becomes lower.

6. The fuel pressure sensor diagnosing device as claimed in claim 5, wherein the failure determination means is connected to an ignition key for starting or stopping the engine and to revolution number detection means for detecting the number of revolutions of the engine, failure determination means determining the engine as having stopped when the ignition key is OFF and the number of revolutions of the engine detected by the revolution number detection means is substantially zero.

7. The fuel pressure sensor diagnosing device as claimed in claim 5, wherein each of the predetermined upper limit value threshold value and predetermined lower limit threshold value are set, on the basis of a fuel temperature detected by the fuel temperature detection means subsequent to the elapsed of the resting and stabilization time, so as to be greater as the fuel temperature becomes lower.

8. The fuel pressure sensor diagnosing device as claimed in claim 7, wherein the failure determination means is connected to an ignition key for starting or stopping the engine and to revolution number detection means for detecting the number of revolutions of the engine, failure determination means determining the engine as having stopped when the ignition key is OFF and the number of revolutions of the engine detected by the revolution number detection means is substantially zero.

9. A fuel pressure sensor diagnosing method for diagnosing a fuel pressure sensor for detecting pressure in a common rail in which a high-pressure fuel to be supplied to an engine is accumulated, the method comprising:

detecting a fuel temperature subsequent to stopping of the engine and obtaining a resting and stabilization time between when a pressure in the common rail drops and when the pressure stabilizes on the basis of this fuel temperature, detecting a stabilized fuel pressure via the fuel pressure sensor subsequent to lapse of the resting and stabilization time, and determining a failure of the fuel pressure sensor when the stabilized fuel pressure exceeds a predetermined upper limit threshold value or is less than a predetermined lower limit threshold value.

* * * * *